April 2, 1963 C. F. BENSON 3,083,549
CONSTANT VELOCITY UNIVERSAL JOINT
Filed Feb. 8, 1962
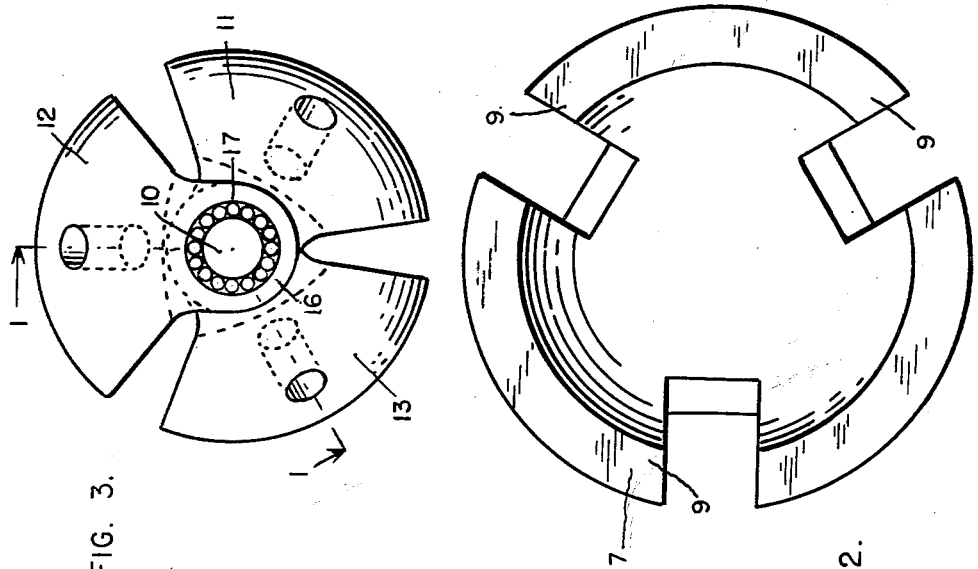
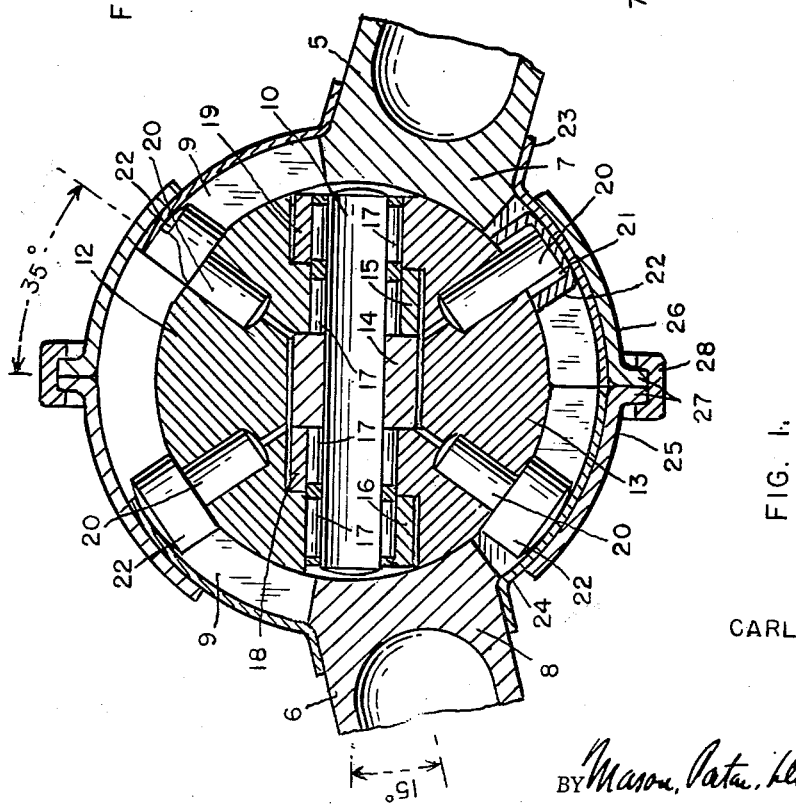
CARL F. BENSON
INVENTOR
ATTORNEYS

United States Patent Office 3,083,549
Patented Apr. 2, 1963

3,083,549
CONSTANT VELOCITY UNIVERSAL JOINT
Carl F. Benson, Torrington, Conn., assignor to The Torrington Company, Torrington, Conn., a corporation of Maine
Filed Feb. 8, 1962, Ser. No. 172,009
5 Claims. (Cl. 64—21)

The following specification relates to an improved constant velocity universal joint adapted for transmission and differential units on a drive for the propeller shaft of an automobile engine and the like.

The transmission of power from an internal combustion engine or the like to a transmission or differential gearing demands the use of shafts which are not axially aligned. It is important under such conditions to provide a coupling between the shaft elements which will have a constant radial velocity throughout the entire circumferential rotation of the shafts.

While this function has been achieved by numerous devices, much improvement can be made in simplicity, efficiency and economy. These advantages are to be found in the present invention.

One of the objects of the invention is to provide simple and interchangeable parts for a universal joint coupling.

A further object of the invention is to effect efficient operation throughout the entire expanse or range for which the joint is designed.

A still further object of the invention is to provide for a self-contained coupling unit to which the shaft elements may be assembled with minimum inter-engagement of the operating parts.

A still further object of the invention is to provide an improved coupling in which the parts have slidable bearings for mutual maintenance of parts in operative relationship.

Among the further objects of the invention is to materially reduce the friction losses that might result from the sliding movement between the several operating units.

The above and other advantages will be apparent from the following description of the preferred form of the invention as illustrated by way of example on the accompanying drawings in which:

FIG. 1 is a longitudinal axial section of the improved universal joint indicated on line 1—1 of FIG. 3;

FIG. 2 is an end view of one of the constituent cups, and

FIG. 3 is an end view of the intermediate coupling unit.

Essentially the invention consists in connecting a driving shaft to a driven shaft by means of part-spherical cups on said shafts and an intermediate part-spherical coupling slidably held in said cups and carrying drive elements connected with the opposite cups.

As illustrated, the axis of the drive shaft 5 is inclined to the axis of the driven shaft 6 in normal operation. Each shaft has a terminal cup 7, 8, respectively. The cups are part-circular and extend approximately 60 degrees from the axis of the shaft on which the cup is mounted. Each cup has radial slots 9 running from the base to the periphery, as shown in FIG. 2. These slots are of uniform width and have parallel side walls so that they form guiding means or tracks for operating rollers. In the form shown there are three equally spaced guide slots 9.

As will be evident from FIG. 1, the cups 7, 8 have a radial extent so that the front faces substantially meet in the axial plane of the shafts and on the side of the lesser angle of inclination. This is shown at the bottom of FIG. 1. On the opposite side, the front faces of the cups 7, 8 will be correspondingly separated, as shown on the same drawing.

In the example shown, the angle between the axes of the shafts is approximately 135 degrees, and the length of each slot is approximately 72 degrees.

The intervening coupling member between the cups is an assemblage of several elements designed to operate together to engage the slots in the opposite cups and to transmit power from one shaft to the other. This intermediate coupling is in a general form of a sphere having a diametrical shaft 10. This shaft is cylindrical and at its center forms the support for a series of part-spherical sectors 11, 12 and 13 (FIG. 3). Each sector has a spherical outer surface formed to provide a sliding bearing with the inner spherical walls of the cups. Each sector has radial side walls as shown on FIG. 3, and which are suitably spaced from the side walls of the adjoining sectors.

Sector 11 is mounted fixedly on the shaft 10 by means of a collar 14. This holds the shaft 10 in position with its center within the collar 14.

Sector 12 has a part-spherical outer surface and radial side walls. In this instance the sector 12 has an inner collar 15 and an outer collar 16. The collar 15 abuts the side of the collar 14, while the collar 16 is separated from the collar 14 to receive an intervening collar. Each of the collars 15 and 16 has roller bearing 17.

The third sector 13 is similar to sector 12 in that it has an inner collar 18 and an outer collar 19. Each collar carries a roller bearing 17. The collars 15, 16, 18 and 19 are alternately disposed on a shaft 10 on opposite sides of the center collar 14.

The sectors 12 and 13 are capable of rocking to a limited extent governed by their approach to the side walls of the sector 11, or their approach on the opposite side.

Each sector has two spaced, radially disposed pins 20, 20. The outer ends of the pins 20 extend into the guiding slots 9 where they are provided with roller bearings 21 and collars 22. The collars 22 are fitted for rolling engagement between the opposite walls of the slots 9, 9. As is seen in the drawings, each sector 11, 12 and 13 has two of the pins 20, 20 with the outer rollers 22, 22. One roller 22 fits in the slot 9 of the opposite cups.

The angular positions of the pins 20, 20 is such that the rollers 22 travel from the inner end of the slots 9 to slightly within the outer ends of the slots. In this way each sector 11, 12 and 13 is constantly linked by the rollers 22, 22 to the opposite cups 7 and 8.

The cup 7 has an outer cover plate 23 which is part-spherical. It forms a cover for the cup 7 and the slots 9. It is co-extensive with the outer walls of the cup 7.

Likewise the cup 8 has a cover 24, also part-spherical and co-extensive with the cup.

The covers 23 and 24 substantially meet at the points where the cups have their nearest approach.

An outer shell is formed of two inter-fitting, part-spherical plates 25 and 26. These have upstanding flanges 27 at their meeting edges and the flanges in turn are held together by a clamping ring 28.

The outer shell is slidably fitted on the covers 23 and 24 so that the shell will have a limited sliding movement with either cup cover dependent upon which offers the minimum friction.

In assembling this universal joint it will be seen that the coupling proper can be readily fitted to one cup, 7, for example, with one roller 22 of each sector in the guide slot 9. In this position the opposite rollers 22 will be in alignment for insertion in the corresponding slots in the opposite cup 8. The shell parts 25 and 26 are now clamped in place by the ring 28 to prevent separation of the cups.

In this assembly the coupling proper moves as a unit. The shafts can be fitted in place on the rollers 22 which are in turn held in proper position. The shafts and cups need not carry any of the inter-engaging elements.

In operation the sectors 10, 11 and 12 move to and fro angularly with respect to one another and each transmits the force from the cup 7 through the pins on the individual sectors to the corresponding slots in the opposite cup 8.

In operation, the resolution of forces acting between the driving cup, the interconnecting sectors on their central pivot shaft, the drive rollers on the periphery of the sectors and the driven cup, together with the angular relationship of these components is such that the sector assembly is constrained to rotate in a plane of rotation which bisects the angle between the driving and driven shafts, thus fulfilling the requirements of a constant velocity joint.

The sectors operate with a minimum of friction. The arrangement is therefore simple and efficient.

While the above description applied to the preferred form of the invention, it will be understood that the structure may be changed in proportions and materials within the scope of the following claims.

What I claim is:

1. A constant velocity universal joint comprising a driving cup and a driven cup, each cup having a plurality of diverging guide slots, and a coupling having a diametrical shaft, a part-spherical sector fixed on the shaft, a plurality of like part-spherical sectors revolvably journaled on said shaft on opposite sides of said first named sector, radially disposed spaced pins on each sector and rollers on said pins rollable in the guide slots in the opposing cups.

2. A constant velocity universal joint comprising a driving cup and a driven cup, each cup having a spherical inner bearing wall and a plurality of diverging guide slots, and a coupling having a diametrical shaft, a part-spherical sector fixed on the shaft, a plurality of like part-spherical sectors revolvably journaled on said shaft on opposite sides of said first named sector, said sectors being in sliding engagement with the bearing walls of the said cups, radially disposed spaced pins on each sector and rollers on said pins rollable in the guide slots in the opposing cups.

3. A constant velocity universal joint comprising a driving cup and a driven cup, each cup having a radial extent less than half a circumference and a plurality of diverging guide slots, and a coupling having a diametrical shaft, a part-spherical sector fixed on the shaft, a plurality of like part-spherical sectors revolvably journaled on said shaft on opposite sides of said first named sector, spaced pins on each sector radially disposed at angles from the shaft not exceeding the angular extent of said slots, and rollers on said pins rollable in the guide slots in the opposing cups.

4. A constant velocity universal joint comprising a driving cup and a driven cup, each cup having a radial extent less than half a circumference and a plurality of diverging guide slots, and a coupling having a diametrical shaft, a part-spherical sector fixed on the shaft, a plurality of like part-spherical sectors revolvably journaled on said shaft on opposite sides of said first named sector, radially disposed spaced pins on each sector, anti-friction bearings on the pins and cylindrical rollers on said bearings rollable in the guide slots in the opposing cups.

5. A constant velocity universal joint comprising a driving cup and a driven cup, each cup having a plurality of diverging guide slots, and a coupling having a diametrical shaft, a part-spherical sector fixed on the shaft, a plurality of like part-spherical sectors revolvably journaled on said shaft on opposite sides of said first named sector, radially disposed spaced pins on each sector, rollers on said pins rollable in the guide slots in the opposing cups, a cover plate on each cup and a shell slidably carried over both cover plates.

References Cited in the file of this patent

UNITED STATES PATENTS

| | | |
|---|---|---|
| 1,965,853 | Morrison | July 10, 1934 |
| 2,342,305 | Seib | Feb. 22, 1944 |
| 2,614,404 | Devos | Oct. 21, 1952 |
| 2,841,968 | Helmke | July 8, 1958 |